United States Patent
Forestelli

(10) Patent No.: US 12,276,572 B2
(45) Date of Patent: Apr. 15, 2025

(54) METHOD AND APPARATUS FOR ASCERTAINING THE PRESENCE OF CRACKS IN SEALED CONTAINERS

(71) Applicant: FT SYSTEM SRL, Alseno (IT)

(72) Inventor: Fabio Forestelli, Alseno (IT)

(73) Assignee: FT SYSTEM S.R.L., Alseno (IT)

( * ) Notice: Subject to any disclaimer, the term of this patent is extended or adjusted under 35 U.S.C. 154(b) by 697 days.

(21) Appl. No.: 17/611,141

(22) PCT Filed: May 14, 2020

(86) PCT No.: PCT/IB2020/054561
§ 371 (c)(1),
(2) Date: Nov. 13, 2021

(87) PCT Pub. No.: WO2020/230070
PCT Pub. Date: Nov. 19, 2020

(65) Prior Publication Data
US 2022/0228943 A1 Jul. 21, 2022

(30) Foreign Application Priority Data
May 16, 2019 (IT) .......... 102019000006922

(51) Int. Cl.
*G01M 3/00* (2006.01)
*G01M 3/20* (2006.01)
*G01M 3/22* (2006.01)

(52) U.S. Cl.
CPC ............ *G01M 3/002* (2013.01); *G01M 3/205* (2013.01); *G01M 3/226* (2013.01); *G01M 3/227* (2013.01); *G01M 3/229* (2013.01)

(58) Field of Classification Search
CPC ...... G01M 3/002; G01M 3/229; G01M 3/227; G01M 3/226; G01M 3/205
USPC ........................................................ 137/551
See application file for complete search history.

(56) References Cited

U.S. PATENT DOCUMENTS

| | | | | |
|---|---|---|---|---|
| 3,708,949 A | * | 1/1973 | Wilcox | G01M 3/227 53/511 |
| 3,837,228 A | * | 9/1974 | Nemeth | G01M 3/205 73/40.7 |
| 5,907,093 A | | 5/1999 | Lehmann | |
| 5,970,778 A | | 10/1999 | Dilger | |

(Continued)

FOREIGN PATENT DOCUMENTS

| | | |
|---|---|---|
| CN | 101592544 A | 12/2009 |
| CN | 106706216 A | 5/2017 |

(Continued)

OTHER PUBLICATIONS

International Search Report and Written Opinion of the International Searching Authority issued for International PCT Application No. PCT/IB2020/054561 on Aug. 26, 2020.

*Primary Examiner* — Minh Q Le
(74) *Attorney, Agent, or Firm* — Howson & Howson LLP

(57) ABSTRACT

A method for ascertaining the presence of cracks in sealed containers includes steps of defining a detection zone (13) in which a sealed container (CT) will be placed, placing a container (CT) in the detection zone (13), ascertaining the presence of a thermal gradient determined by the container in the detection zone (13), the thermal gradient being indicative of the presence of a crack in the container (CT).

6 Claims, 3 Drawing Sheets

(56) References Cited

U.S. PATENT DOCUMENTS

| | | | |
|---|---|---|---|
| 6,427,524 B1 | 8/2002 | Raspante et al. | |
| 12,085,482 B2 * | 9/2024 | Forestelli | G01M 3/207 |
| 2004/0003914 A1 * | 1/2004 | Avila | G01M 3/002 |
| | | | 165/11.1 |
| 2005/0056031 A1 | 3/2005 | Jeong | |
| 2008/0008223 A1 | 1/2008 | Guillet | |
| 2010/0313634 A1 * | 12/2010 | Wetzig | G01M 3/226 |
| | | | 73/40.7 |
| 2011/0113861 A1 * | 5/2011 | Maehira | G01M 3/229 |
| | | | 73/40.7 |
| 2011/0310923 A1 | 12/2011 | Strohmeyer | |
| 2016/0054194 A1 | 2/2016 | Lehmann | |
| 2016/0116364 A1 * | 4/2016 | Vaccaro | G01M 3/229 |
| | | | 73/40.7 |
| 2016/0223423 A1 * | 8/2016 | Howieson | G01M 3/186 |
| 2017/0108397 A1 * | 4/2017 | Miller | G01M 3/04 |
| 2018/0052072 A1 * | 2/2018 | Koh | G01M 3/04 |
| 2018/0217019 A1 | 8/2018 | Furumoto et al. | |
| 2019/0003917 A1 | 1/2019 | Goebel et al. | |
| 2019/0078966 A1 * | 3/2019 | Zhang | G01M 3/002 |
| 2021/0264584 A1 * | 8/2021 | Zhang | G06T 7/0004 |

FOREIGN PATENT DOCUMENTS

| | | |
|---|---|---|
| DE | 4140725 A1 | 6/1993 |
| DK | 201570808 A1 | 6/2017 |
| JP | S55-109942 A | 8/1980 |
| JP | H03-167434 A | 7/1991 |
| JP | H04-279850 A | 10/1992 |
| JP | H08-184571 A | 7/1996 |
| JP | 2000-088781 A | 3/2000 |
| JP | 2012-225871 A | 11/2012 |
| WO | 2013/011329 A2 | 1/2013 |
| WO | 2017/125386 A2 | 7/2017 |

* cited by examiner

METHOD AND APPARATUS FOR ASCERTAINING THE PRESENCE OF CRACKS IN SEALED CONTAINERS

TECHNICAL FIELD

The invention concerns a method and an apparatus for ascertaining the presence of cracks in sealed containers. The method and the apparatus according to the invention are arranged to allow detecting leakages of fluids from sealed containers. More particularly, but not exclusively, said fluids can be in gas or vapour state and can consist of gases or gas mixtures, or of vapours or vapour mixtures, or of gas and vapour mixtures. Said containers can be both rigid containers, such as for instance glass jars or bottles, and containers having at least one flexible wall portion, such as for instance plastic tubs, bags and flexible packages of different kinds.

PRIOR ART

At present, many beverages and products intended for use as food, of for other uses, are preserved by mainly using one of the following packaging ways.

According to a first way, mainly used for preserving liquids, a rigid or semi-rigid container is filled with the substance to be preserved through a suitable opening provided for in the container. Subsequently, the opening is sealed by means a suitable closing element, for instance a cap. In other cases, the product to be preserved is wrapped by means of ribbons or films or is introduced into tubes of flexible plastic material, and subsequently the package thus obtained is sealed by welding along one or more junction lines. In still other cases, it is known to use tubs of plastic material formed in advance. The tubs are filled through an opening provided therein and subsequently the opening is sealed by means of a plastic film welded to the tub walls.

More generally, food products, but non only, are preserved in sealed packages aimed at preserving as long as possible unchanged in time the chemical-physical characteristics the product has at the packaging time.

Thus, one of the main problems encountered in applying the aforesaid methods is how to obtain an optimal sealing of the package in order to avoid contaminations with the outside environment. In many applications, an optimal sealing results in a closure that has to be substantially hermetic at the outside pressure at which the package is kept, or anyway at the pressure the package is subjected to during its normal use, transportation and storage. For instance, in case of food products, the package has to be substantially hermetic when it is at atmospheric pressure, to prevent the environment inside the package from communicating with the outside environment thereby causing substance and air to pass from one environment to the other, and hence to prevent the risk of contaminating the packaged product and the decay of its organoleptic properties.

In case of containers sealed by welding, the hermetic sealing of the package can be jeopardised for instance by an imperfect welding due for instance to a wrong execution of the welding process. Errors in setting the welding temperature, a wrong choice in the adhesive weld material, the imperfect planarity of the contacting surfaces in the welding area and the presence of impurities or foreign bodies in the welding area are all factors that can compromise the attainment of a hermetic sealing of the container.

In case of rigid or semi-rigid containers, such as bottles, which are closed by a cap, as well known, the hermetic sealing can be jeopardised for instance by a malformation of the same cap or of the bottle, in the region where the cap is to be applied, or by operation problems of the capping machine, for instance problems of alignment in the cap application step.

Generally, losses of substance from containers occurring because of apparent imperfections in the container closure can be easily detected, even visually, by a heedful operator. Such losses generally entail an evident spillage of substance from the container. Under such circumstances, therefore, a heedful operator, in charge of the supervision of a packaging line, can easily identify imperfect containers and remove them, if necessary, immediately downstream of the filling and sealing step, mainly in order to discard them and to prevent them from being offered to the consumer, or to submit them to further checks or to repairs.

As it can be easily understood, detection of leakages from the containers is the more difficult for the operator the smaller is the leakage, as is the case of a leakage due to micro-cracks and micro-holes. Those leakages are defined micro-leaks, i.e. leaks of very small amount from the container, which are not immediately detectable since they do not entail an evident spillage of liquids or other substances, but in the long run they can compromise the product quality. Such micro-leaks are generally caused by cracks of the order of some ten microns and even as small as some microns, for instance 3-7 μm.

To solve the problem of how to effectively detect the presence of micro-leaks from sealed containers, several solutions have been hitherto proposed.

A first known solution to the problem of how to detect leakages from heat-sealed containers is disclosed for instance in U.S. Pat. No. 3,708,949 (A). This document discloses a method and an apparatus for forming and subsequently checking the tightness of heat-sealed envelopes. The method disclosed in such a document substantially includes a step in which the container is sealed, after introduction of a modified atmosphere, a step in which the container is submitted to a mechanical stress in order to reduce the volume enclosed by the container walls and consequently increase the pressure of the gases enclosed in the container thereby promoting their spillage if micro-cracks are present, a step in which a gas detector detects the presence, outside the container, of a tracer gas present in the modified atmosphere, and a step in which the container having failed to pass the check is removed.

Another known method for testing the tightness of a thermo-sealed container is disclosed in WO2013/011329 (A2). According to the teaching of this document, the container is filled with a tracer gas and is submitted to compression in order to promote gas spillage through micro-cracks possibly present in the sealing area. Suitable detectors, including pairs of electrodes, are located in the vicinity of the regions of the container where gas micro-leaks are more likely to occur. A change in the electrical voltage at the detector electrodes causes detection of the presence of tracer gas.

WO2017125386 (A2) discloses a method in which a chemical substance, typically in the form of a strip, is applied to the container. The substance is such that its physical and/or chemical properties change depending on the concentration of a gas, for instance oxygen, contacting the substance. The change in the properties of the substance gives rise to a change in the frequency, wavelength or phase of an electromagnetic radiation emitted, detectable by a detector located outside the container.

DK201570808 (A1) discloses an apparatus for detecting gas leaks from sealed containers into which a tracer gas has been introduced. The apparatus includes an analysis chamber, in which the container is received during the hermetic tightness test, and a device capable of creating vacuum inside the chamber. A gas detector is placed in communication with the chamber in order to detect the presence of the tracer gas.

Therefore, according to the teaching of the prior art, the step of detecting micro-leaks is generally performed with the aid of a tracer gas, typically carbon dioxide ($CO_2$), helium (He) or hydrogen ($H_2$), introduced into the container before the latter is sealed. The presence of tracer gas outside the container is generally detected by means of detectors, for instance electrodes, usually when liquids or tracer gases such as He are to be detected, or detectors the operation of which is based on the non-dispersive infrared (NDIR) technique or other techniques, in order to detect $CO_2$ leakages.

It is a first object of the invention to provide a method and an apparatus for ascertaining the presence of cracks in sealed containers, which are not subject to the limitations and the drawbacks set forth above of the prior art.

It is another object of the invention to provide a method and an apparatus of the above kind that allow detecting leakages from containers of different kinds, of either rigid or flexible type, with or without mechanical squeezing of the container, even in case the leak is due to small or very small cracks, i.e. it corresponds to a micro-leak, and is caused by an opening of few microns.

It is a further object of the invention to provide a method and an apparatus for detecting leakages from sealed containers allowing an improved operation speed if compared to the prior art, that is a method and an apparatus that allow a faster detection of leakages, if any, and thus allow maximising the operation speed of the production or container processing plant.

It is yet another object of the invention to provide a method and an apparatus of the above kind allowing a higher precision in leakage detection, even in case of perturbations or alterations in the conditions of the surrounding environment.

It is a further, but not the last object of the invention to provide a method and an apparatus that are reliable and can be used in cheap manner, so that they can have a large scale industrial utilisation.

The above and other objects are achieved by means of the method and the apparatus as claimed in the appended claims.

DESCRIPTION OF THE INVENTION

The method for ascertaining the presence of cracks in sealed containers mainly includes the step of defining a detection zone in which a sealed container will be placed and the step of ascertaining the presence of a thermal gradient, indicative of the presence of a crack in said container, when said container is in the detection zone.

Contrary to the prior art devices, the operation of which is based on sensors of the concentration of specific tracer gases, the method and the apparatus according to the present invention enable ascertaining the presence of a leak from a container by measuring a thermal gradient, without therefore requiring the presence and the measurement of tracer gases and without exploiting pressure differences.

Advantageously, the apparatus according to the invention can optionally include mechanically stressing means for submitting a sample container to be tested to squeezing, in order to promote the thermal exchange between the sample and the environment in which detection takes place.

Said mechanically stressing means can include a squeezing assembly preferably including a pair of rotatable rollers preferably transversely arranged relative to the advance direction of the product to be checked and having rotation axes substantially parallel to the plane on which the product advances. When the products to be checked advance on a conveyor belt, the rotatable rollers are therefore preferably arranged with their rotation axes transverse to the advance direction of the belt and on a plane parallel to the belt plane.

In accordance with the invention, the sealed container to be checked, which is at a temperature Tc, is placed in the detection zone preferably by means of a positioning assembly including at least one conveyor belt, or a carrousel, or a conveyor or any other apparatus capable of transferring the container to the detection zone.

In accordance with a particular embodiment of the invention, the detection zone is defined inside a detection tunnel the atmosphere of which is kept at a temperature Ta. Preferably, at least one temperature sensor and/or at least one thermal camera, sucking means and squeezing means are provided in the detection tunnel.

In a further particular embodiment of the invention, the detection tunnel is made so as to ensure that the Reynolds number is kept as low as possible. An increase of the Reynolds number in the detection zone can give rise to vortices or air turbulences, and such phenomena can negatively affect thermal gradient detection. In order to precisely distinguish the thermal gradient due to a leak in the passing sample container from the gradient due to turbulent motion of the flows and to the geometry of the passing container, it is therefore necessary to increase as much as possible the difference between Ta e Tc and to provide a tunnel geometry allowing maintaining the air motion in the tunnel as much as possible laminar, so as to keep the Reynolds number low.

According to a preferred embodiment of the invention, the detection tunnel is at least one metre long and is equipped with air barriers at least at the entrance, and more preferably at the entrance and the exit, of the tunnel. The air barriers can for instance be created by means of air diffusers equipped with rectilinear slots and configured so as to define corresponding air curtains or blades, i.e. air flows that, when diffused by the suitably configured slots, are substantially spread over a plane surface and, thanks to the flow speed, maintain such a configuration over a certain distance from the diffusers.

Preferably, the detection tunnel is further equipped with heating and/or cooling means for maintaining constant the temperature in the tunnel in which a sample container to be tested passes. Said means are capable of maintaining the temperature constant and uniform in the whole tunnel thereby avoiding turbulences or thermal gradients.

In a particularly preferred embodiment of the apparatus, the tunnel is configured so as to substantially define a thermostat, i.e. a system capable of yielding or absorbing heat without changing its temperature. In a preferred embodiment, the tunnel is equipped with ducts in which a fluid at constant temperature flows. Preferably, the ducts are located near the tunnel walls, so as not to hinder passage of the sample through the detection zone.

In accordance with a first embodiment of the invention, the presence of a thermal gradient is ascertained by means of at least one thermal camera. Advantageously, the method according to this first embodiment of the invention can be implemented by using a plurality of thermal cameras arranged to monitor, with their range of action, at least part of the detection zone. Yet, implementation by means of thermal cameras could result slow and expensive with respect to the needs of the container control lines in industrial plants and, moreover, a method based on the detection of a thermal gradient by means of thermal cameras could result insufficiently sensitive to micro-leaks from the sample passing through the detection zone.

In accordance with a second embodiment of the invention, the presence of a thermal gradient is ascertained by means of a temperature sensor.

Preferably, the apparatus according to this second embodiment of the invention includes a detection head located in the detection tunnel and provided with sucking means sucking the gas mixture from multiple points in the tunnel and directing the mixture to several temperature sensors.

Preferably, the detection zone communicates with at least one temperature sensor through at least one duct through which air sucked from said detection zone is transferred to the temperature sensor.

BRIEF DESCRIPTION OF THE FIGURES

Some preferred embodiments of the invention will be provided by way of non-limiting examples with reference to the accompanying Figures, in which.

In all Figures, the same reference numerals have been used to denote equal or functionally equivalent components.

DESCRIPTION OF A PREFERRED EMBODIMENT

Figure 1:
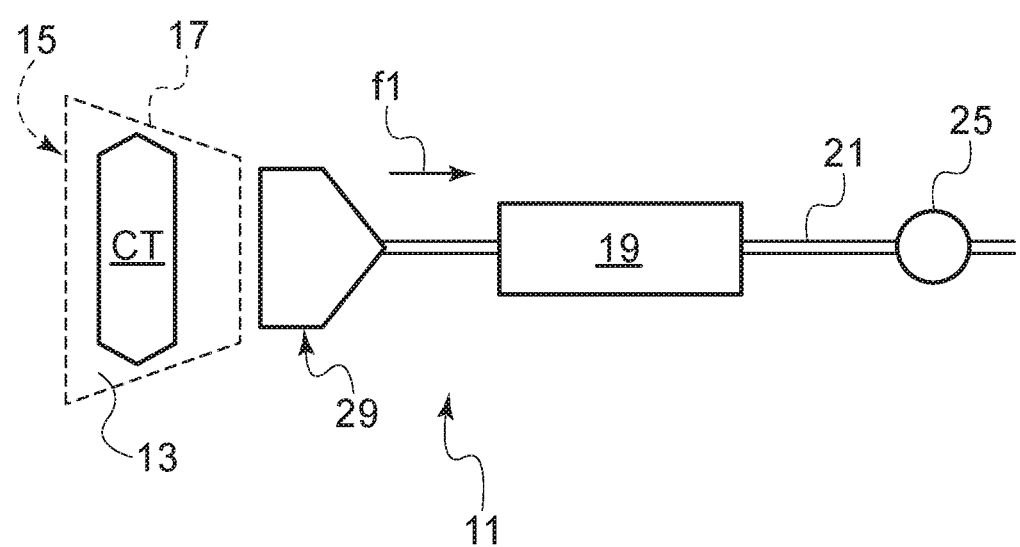
FIG. 1 is a schematic representation of a preferred embodiment of the invention.

Referring to FIG. 1, there is schematically shown a detection apparatus 11 made in accordance with a preferred embodiment of the invention and including a detection zone 13. Detection zone 13 is arranged to receive a sealed container CT that is to be checked for ascertaining the presence of possible leakages, i.e. of openings capable of putting the content of container CT in communication with the surrounding environment outside the container. In accordance with a preferred embodiment of the invention, detection zone 13 is defined by a supporting structure 15 including a frame 17 and it communicates with the outside environment.

Apparatus 11 further includes a temperature sensor device 19, arranged to generate an electrical signal indicative of the presence of a thermal gradient in a gas mixture passing through or licking said sensor 19. In a particular embodiment of the invention, sensor 19 is a thermistor made of a sintered semiconductor material that, in response to a small temperature variation, exhibits a great resistance variation. The gas mixture to be analysed, when passing through sensor 19, causes an alteration in at least one parameter of an electrical signal passing in an electrical circuit associated with the sensor. The alteration is proportional to the thermal gradient induced by the gas mixture passing through sensor 19. In other embodiments, temperature sensors of different type could be used. Such kinds of sensors are known to the skilled in the art and therefore they will not be described in more detail.

Apparatus 11 further includes a duct 21 communicating with detection zone 13 and with said temperature sensor 19. According to the invention, and as it will become more apparent from the description below, gases flow through duct 21 in the direction shown by arrow f1, from detection zone 13 to sensor 19, in a step of gas suction from said detection zone 13.

In this preferred embodiment of the invention, duct 21 communicates with detection zone 13 through a conveyor 29. According to the invention, a single detection zone 13 could be equipped with a plurality of conveyors 29. For instance, conveyors 29 surrounding container CT passing in zone 13 could be provided, so that substantially the whole of the side surface of container CT passing in zone 13 is submitted to the effect of the air suction by conveyors 29.

Turning back to FIG. 1, a preferred embodiment of the method for detecting leakages from sealed containers according to the invention will be described hereinafter.

The method mainly includes a step in which a container the tightness of which is to be checked is placed in detection zone 13 and a step in which air present in said detection zone 13 is sucked through at least one suction duct 21 communicating with said detection zone 13.

Thus, according to the invention, the method for detecting leakages mainly and preferably includes the steps of:
 defining a detection zone 13 in which a sealed container will be placed;
 putting said detection zone 13 in communication with a temperature sensor 19 through a duct 21;
 placing a container in said detection zone 13;
 sucking a gas sample from said detection zone 13 through said duct 21 and transferring it to sensor 19 for ascertaining the presence of a gas leakage in said container.

Optionally, the method according to the invention includes a step in which the sample container undergoes a compression or squeezing step, for promoting possible gas spillage. Preferably, said squeezing step is performed by means of a squeezing assembly including rotatable rollers.

Figure 2:
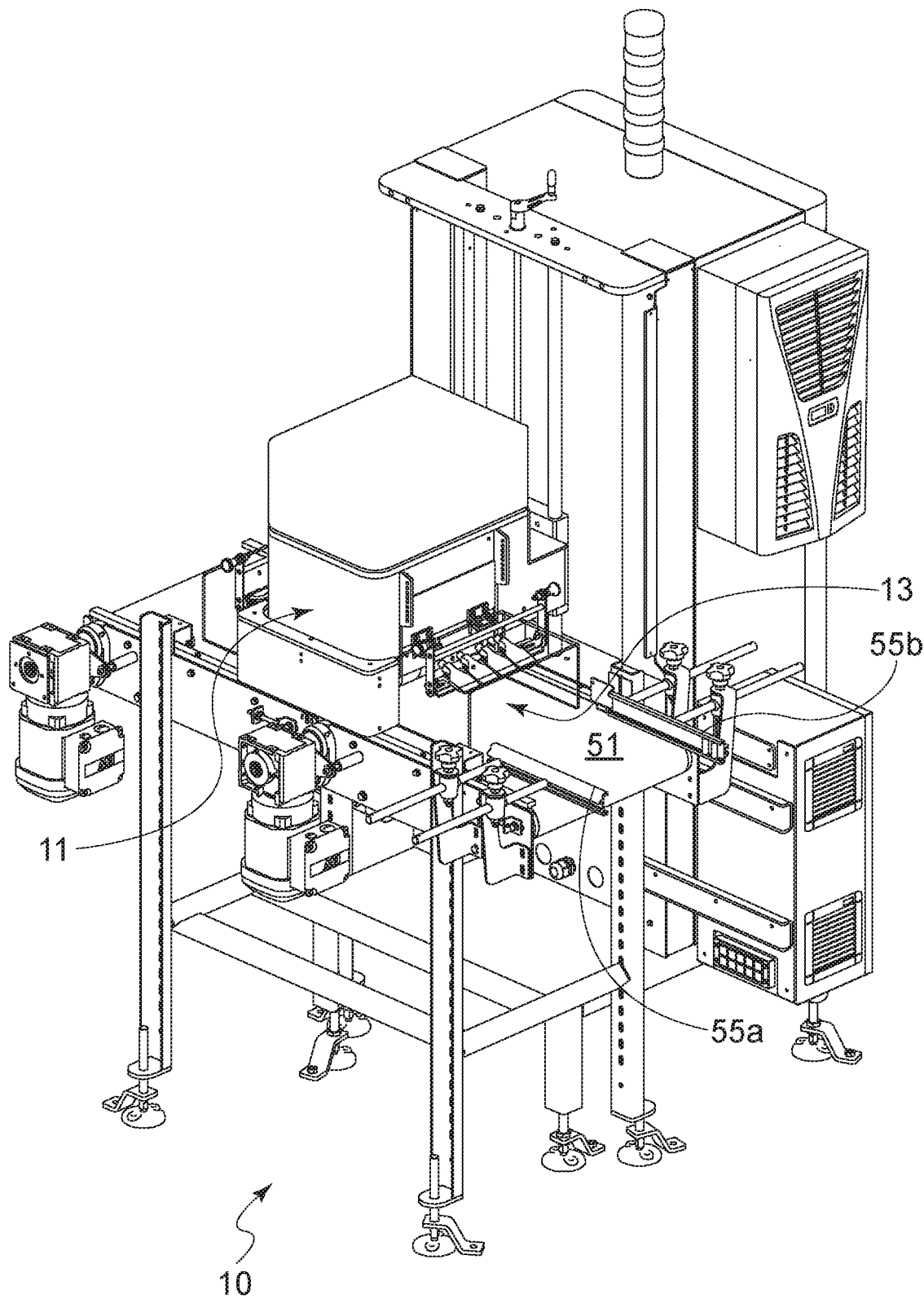
FIG. 2 is a side perspective view of the apparatus according to a preferred embodiment of the invention.

Referring to FIG. 2, according to the embodiment of the invention illustrated, a sample container to be tested is placed in detection zone 13, defined in an equipment 10 incorporating apparatus 11 according to the invention, by means of a positioning assembly 51. According to this embodiment, positioning assembly 51 includes a corresponding conveyor belt for the introduction or entrance of the container into detection zone 13 and for the extraction or exit of said container from detection zone 13. Preferably, said positioning assembly 51 further includes a pair of side guides 55a, 55b for correctly positioning the container in detection zone 13, preferably centrally of zone 13.

Figure 3:
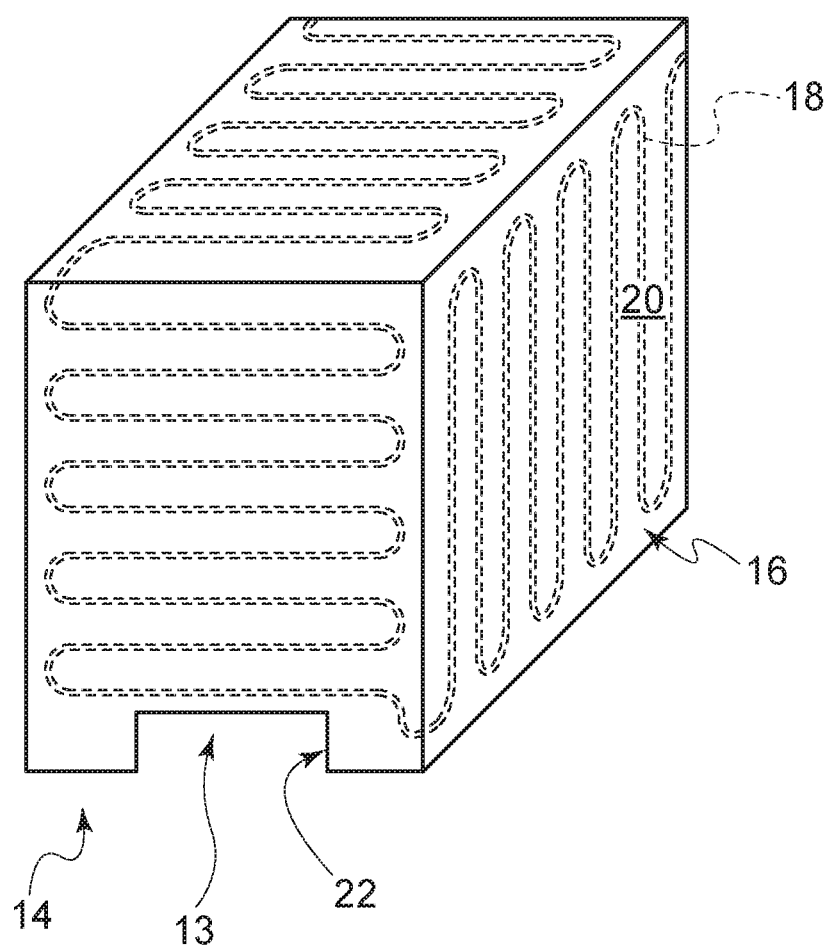
FIG. 3 is a side perspective view of a detection tunnel incorporated into the apparatus shown in FIG. 1.

Referring to FIG. 3, a particular embodiment of the invention is shown in which detection zone 13 is defined inside a corresponding detection tunnel 14. In accordance with this embodiment of the invention, tunnel 14 is equipped with heating and/or cooling means 16 for maintaining constant the temperature in the tunnel in which sample container CT to be tested passes. Said means 16 are arranged to maintain temperature constant and uniform in the whole tunnel, thereby avoiding turbulences or thermal gradients In the embodiment illustrated, tunnel 14 is equipped with ducts 18 in which a fluid at constant temperature, for instance water, flows. Preferably, ducts 18 are located near or at tunnel walls 20, so as not to hinder the passage of sample CT through detection zone 13 defined inside the same tunnel. Preferably, said ducts 18 can include a single corresponding pipe defining a winding path extending over a great part or the major part of the surface of walls 20 of tunnel 18 surrounding detection zone 13.

Always in accordance with the invention, entrance opening 22 for sample product CT is preferably occupied by an air curtain or blade distributed on a plane substantially perpendicular to the advance direction of the sample product passing through detection zone 13.

INDUSTRIAL APPLICABILITY

The invention finds industrial application in several fields, for detecting leaks and micro-leaks from containers of substantially any kind, either compressible or rigid. The invention can also be applied for detecting leakages of liquids, for instance water or beverages, from pressurised rigid containers.

The invention as described and illustrated can undergo several variants and modifications all falling within the same inventive principle.

The invention claimed is:

1. A method for ascertaining the presence of cracks in sealed containers, said method comprising the steps of:
    defining a detection zone (13) adapted to receive a sealed container (CT);
    placing a container (CT) in said detection zone (13);
    ascertaining the presence of a thermal gradient determined by said container in the detection zone (13), said thermal gradient being indicative of the presence of a crack in said container (CT);
    wherein the presence of a thermal gradient is ascertained by a temperature sensor; and
    wherein a step is provided of putting said detection zone (13) in communication with a temperature sensor (19) through at least one duct (21), and sucking gas from said detection zone (13) through said duct (21) and transferring the gas to the temperature sensor (19) for ascertaining the presence of a thermal gradient caused by the presence of a fluid leakage from said container (CT).

2. The method according to claim 1, wherein a step is provided of maintaining, in said detection zone (13), an atmosphere at a predetermined constant temperature during passage of the container (CT) through said detection zone (13).

3. The method according to claim 1, wherein a step is further provided of submitting said container (CT), when placed in said detection zone (13), to squeezing for promoting possible spillage of fluid from said container (CT) through a crack that may be present in said container.

4. An apparatus for ascertaining the presence of cracks in sealed containers, said apparatus comprising:
    a detection zone (13) adapted to receive a sealed container (CT);
    at least one temperature sensor (19) for ascertaining a presence of a thermal gradient determined for said container (CT) in the detection zone (13), said thermal gradient being indicative of a presence of a crack in said container (CT);
    a duct (21) communicating with said detection zone (13) and said at least temperature sensor (19); and
    a suction fan (25) communicating with said duct (21) and located downstream of said at least one temperature sensor (19), the suction fan (25) being configured for sucking gas from the detection zone (13) through the duct (21) and transferring the gas to the at least one temperature sensor (19).

5. The apparatus according to claim 4, wherein said detection zone (13) is defined in a detection tunnel (14) equipped with means (16) for maintaining constant temperature of an atmosphere in said detection zone (13).

6. The apparatus according to claim 5, wherein the means for maintaining constant temperature comprises ducts (18) in which a fluid at constant temperature flows, said ducts being located at or near walls (20) of the detection tunnel (14) so as not to hinder passage of the container through the detection zone.

* * * * *